July 7, 1936.  R. MOORE  2,046,788
PLANTER ATTACHMENT FOR TRACTORS
Filed Nov. 5, 1935
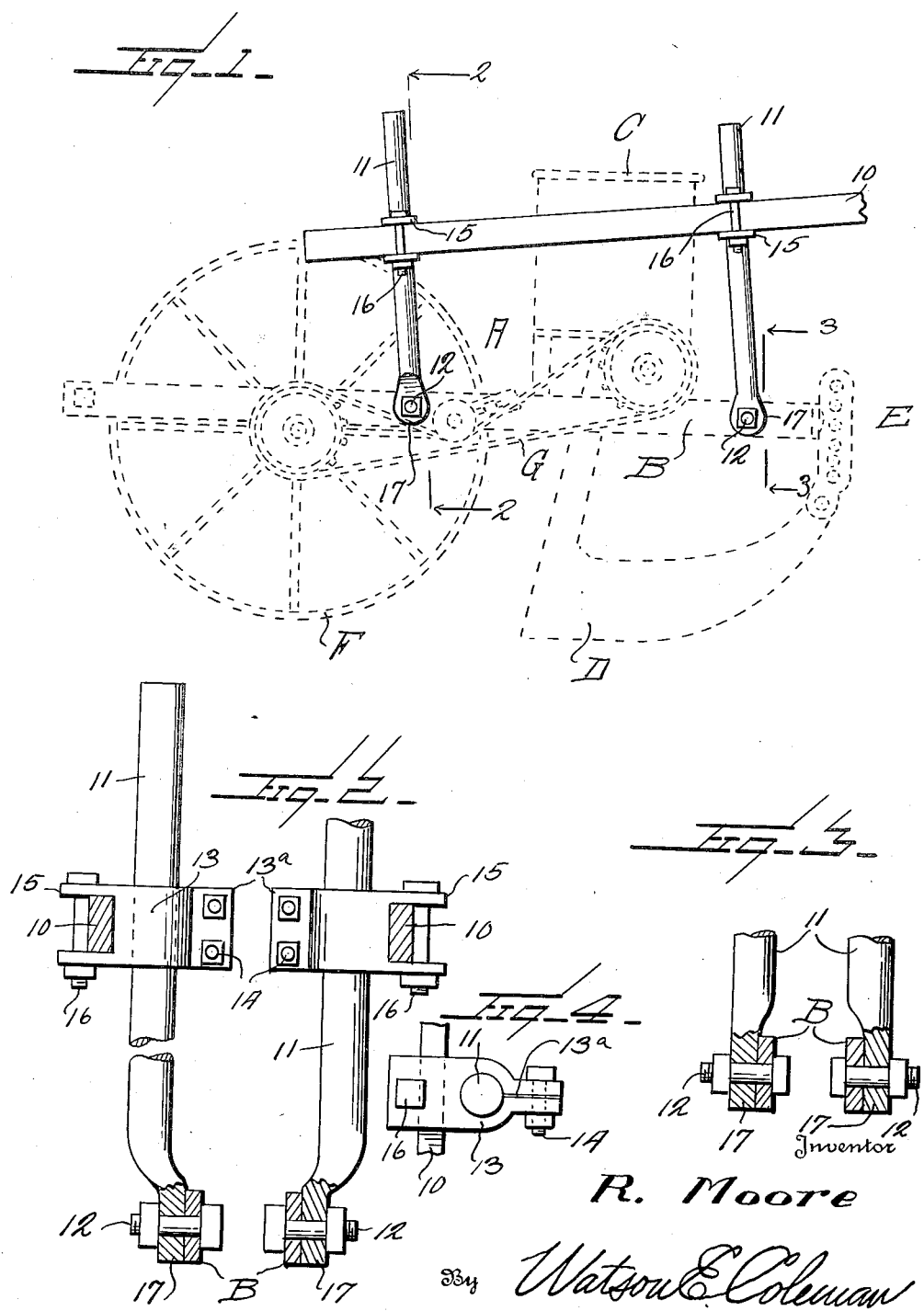

Patented July 7, 1936

2,046,788

UNITED STATES PATENT OFFICE 2,046,788

PLANTER ATTACHMENT FOR TRACTORS

Rowland Moore, Glendale, Ariz.

Application November 5, 1935, Serial No. 48,395

4 Claims. (Cl. 111—52)

This invention relates to means whereby a planter may be attached to the cultivator beams of a farm tractor, and the object of the invention is to provide very simple means whereby the rectangular frame of a planter may be attached to the cultivator beams of a tractor, these beams ordinarily extending downward in pairs below the tractor, and a further object is to provide means of this character which will permit the easy adjustment of the planter with reference to the tractor and will permit the lifting or the lowering of the planter at the same time as the cultivator beams are lifted and by the mechanism which lifts the cultivator beams.

My invention is illustrated in the accompanying drawing wherein:

Figure 1 is a side elevation of the cultivator beams of a tractor with my planter supporting the attachment applied thereto, the planter being shown in dotted lines;

Figure 2 is a section on the line 2—2 of Figure 1;

Figure 3 is a section on the line 3—3 of Figure 1;

Figure 4 is a top plan view of the clamp used.

The ordinary "Farmal" tractor which is typical of many farm tractors has means for supporting a plurality of pairs of cultivator beams. These are pivoted at their forward ends to the frame of the tractor. My invention consists in providing means whereby a planter frame may be connected directly to these beams and raised or lowered with the beams.

In the drawing, 10 designates the two beams of the tractor. These, at their forward ends, are pivoted to the tractor in a manner well known and requiring no illustration. These beams are raised and lowered by mechanism commonly found in all tractors for this purpose, and the beams are ordinarily urged downward by spring means so as to resiliently force the cultivator shovels and other devices commonly attached to the beams into the ground.

The planter which I have illustrated in dotted lines in Figure 1 and which is designated generally A, is of any ordinary or common construction but includes commonly a more or less rectangular frame B which supports the seed box C, and depending from the frame B below the seed box is the usual shoe D and connected to the forward end of the frame B for vertical adjustment is the upwardly extending perforated element E. The rear end of the frame B supports the usual traction wheel F which drives the seed feeding mechanism by means of the sprocket chain G.

My invention consists in connecting the frame B of the planter to the beams 10 of the tractor by means of the rigid metallic posts 11 which at their lower ends are pivoted by means of the bolts 12 to the frame B and which are at their upper ends passed through clamping members 13. Each clamping member, as illustrated in Figure 4, is split at 13ª so as to embrace the post 10 or rod 11, the split portions of the clamping members being adjusted towards each other by means of a bolt 14 so that when the bolt is tightened, the clamping members will be rigidly engaged at any desired height on the posts 11. The opposite end of each clamping member from the split 13ª is forked, as at 15, to embrace the beam 10, as shown in Figure 2, and this fork may be contracted upon the beam so as to hold it in adjusted position on the beam by means of the bolt 16. In view of the fact that the frame B of the planter is ordinarily narrower at its rear end than at its forward end, the rear posts or members 11, as illustrated in Figure 2 are deflected inward, as at 17. The forward posts 11, however, are not so deflected as shown in Figure 3, but extend straight downward over the exterior face of the frame B and are bolted thereto by means of the bolts 12.

It will be seen that by the use of these members 13, the planter may be held in a horizontal position or any other desired position relative to the beams 10. This is due to the fact that the members 11 are pivotally connected at their lower ends by the bolts 12 to the frame B, so that they may be inclined to vertical planes, as shown in Figure 1, and thus be disposed at right angles to the beams 10. The clamps 13 are individually adjustable upon the members 11 and are individually adjustable upon the beams, thus securing any desired adjustment for the planter either forward or rearward upon the beams 10 and securing a vertical adjustment of the planter with reference to the beams.

While I have referred to my attachment comprising the members 11 and the clamps 13 as being particularly designed for use with a "Farmal" tractor, all general utility farm tractors have similar beams or frames for the attachment of shovels, etc.

Heretofore, it has been necessary, if a planter is to be attached to the tractor, that the beams or frame members 10 of the tractor be removed. By means of this attachment, however, the planter is attached to these self-same beams so that no removal is required.

Furthermore, these beams are controlled as to pressure by springs and these springs, which ordinarily act to resiliently depress the beams, will take care of any inequality of pressure. Therefore, there will be no necessity of providing spring means individual to the planter for depressing the planter. Thus the standard attachment of the tractor is utilized as a frame upon which the planter is mounted, which permits the planter to be placed further forward upon the tractor so that a better view of its operation may be had by the operator, and the standard equipment of the tractor used for raising or lowering the beams 10 will be used for raising or lowering the planter.

Furthermore, where planters have been mounted upon tractors, the working depth of the planter cannot be regulated with any nicety whereas where the shanks or members 11 are employed, the adjustment as to depth of work of the planter can be very readily made since this adjustment is secured entirely by the clamps 13 and a very fine adjustment can, therefore, be secured.

This attachment will permit either two or four planters to be mounted upon the beams of the tractor and my attachment can be used on any all-purpose tractor for the planting of corn, cotton, etc.

It is to be understood that these shanks or members 11 are made of 1½ inch steel bars so that it makes them particularly rigid and particularly adapted for working in hard soil.

What is claimed is:—

1. A planter supporting attachment for tractors having cultivator beams, comprising a forward pair of shanks and a rear pair of shanks, each shank at its lower end being perforated for the passage of a bolt whereby it may be attached to the frame of a planter, the rear shanks at their lower ends being laterally deflected, and clamps mounted upon the shanks, each clamp being adjustable vertically upon its shank and having means whereby it may be held in its adjusted position, each clamp being formed to embrace a beam of the cultivator and be clamped in adjusted position thereon.

2. The combination with cultivator beams and a planter disposed below the beams and having a frame, of a forward pair of shanks and a rearward pair of shanks, each shank at its lower end being apertured, bolts passing through the lower ends of the shanks and into the planter frame, split clamps mounted upon the shanks, bolts closing said split clamps upon the shanks, said bolts when released permitting the adjustments of the clamps upon the shanks, each clamp being forked at one end to embrace a corresponding beam, and a bolt passing through each fork and adapted to clamp the fork upon the beam.

3. A planter supporting attachment for tractors having cultivator beams, including a forward pair of shanks and a rear pair of shanks, each shank at its lower end being perforated for the passage of a bolt whereby it may be attached to the frame of a planter, and clamps mounted upon the shanks, each clamp being adjustable vertically upon its shank and having means whereby it may be held in its adjusted position, each clamp being formed to embrace a beam of the cultivator and be clamped in adjusted position thereon.

4. A shank for supporting a planter upon a tractor having a cultivator beam, the shank being perforated at its lower end whereby it may be bolted to the frame of a planter, a clamp mounted upon the shank, the clamp having a passageway through it for the shank and being split at said passageway, and a bolt passing through the split portion of the clamp whereby the clamp may be tightened upon the shank, the shank being forked at its end opposite said bolt to embrace a beam of the cultivator and having a bolt passing through said forked portion whereby the forked portion may be clamped upon said beam.

ROWLAND MOORE.